W. A. McCOLLOUGH.
INDIVIDUAL WATERING TROUGH.
APPLICATION FILED APR. 4, 1921.

1,413,750.
Patented Apr. 25, 1922.

INVENTOR:
W. A. McCOLLOUGH
By Earl M. Sinclair
Atty.

UNITED STATES PATENT OFFICE.

WILLIAM A. McCOLLOUGH, OF WEBSTER CITY, IOWA, ASSIGNOR TO W. A. McCOLLOUGH & SONS, INC., OF WEBSTER CITY, IOWA, A CORPORATION OF IOWA.

INDIVIDUAL WATERING TROUGH.

1,413,750.  Specification of Letters Patent.  Patented Apr. 25, 1922.

Application filed April 4, 1921. Serial No. 458,277.

*To all whom it may concern:*

Be it known that I, WILLIAM A. McCOLLOUGH, a citizen of the United States of America, and resident of Webster City, Hamilton County, Iowa, have invented a new and useful Individual Watering Trough, of which the following is a specification.

The object of this invention is to provide an improved construction for watering troughs for swine and other domestic animals.

A further object of this invention is to provide an improved watering trough especially designed for use by individual animals confined singly in pens, crates or the like.

A further object of this invention is to provide a watering trough which is formed of sheet metal and especially strengthened on its sides to prevent crushing.

A further object of this invention is to provide improved means for adding weight to a small trough to prevent its being unduly moved about or overturned by the animals using it.

With these and other objects in view, my invention consists in the construction, arrangement and combination of elements hereinafter set forth, pointed out in my claims and illustrated by the accompanying drawing, in which—

Figure 1:
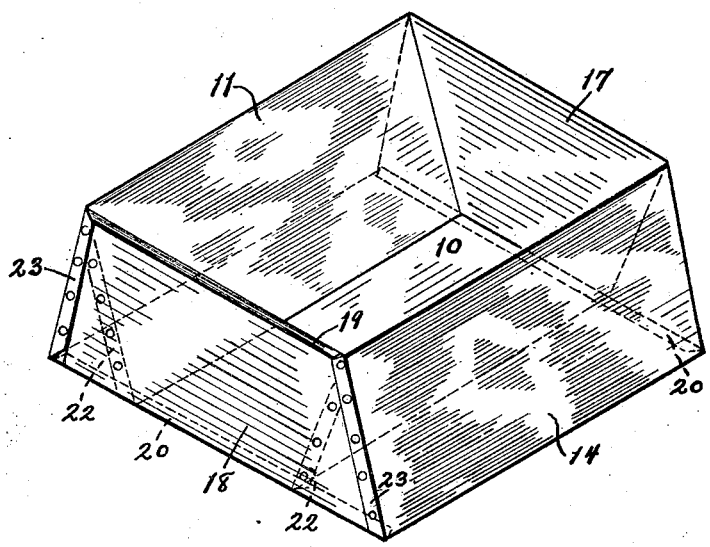
Figure 2:
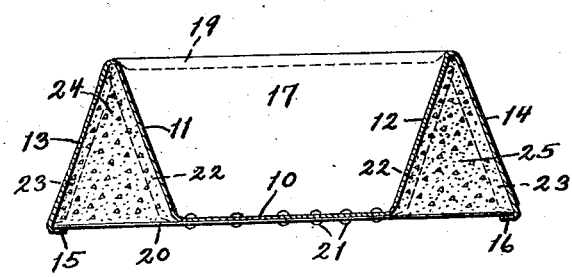

Figure 1 is a perspective view and Figure 2 a cross-section of a trough embodying my improvements.

In the construction of the device as shown a single sheet of metal is bent, shaped and formed to produce a bottom 10, outwardly sloping side walls 11, 12 rising from said bottom and downwardly and outwardly sloping abutment walls 13, 14 extending from the tops of said side walls to the horizontal plane of said bottom. The spaces between the side walls 11, 12 and abutment walls 13, 14 are substantially V-shaped in cross-section, and the lower margins of said abutment walls are turned inwardly to form horizontal flanges 15, 16 which are preferably slightly below the plane of said bottom 10. Separate end walls 17, 18 are provided which are trapezoidal in form and mounted against the respective ends of the bottom, side walls and abutment walls and secured thereto. Each end wall is preferably rolled or curved outwardly at 19, at its upper margin, and is formed at its lower margin with an inturned flange 20 engaging beneath the end portions of the bottom 10 and above and retained by the horizontal flanges 15 and 16 of the abutment walls. End portions of the bottom 10 may be secured to the underlying flanges 20 by means of rivets 21 and also, in sealed relation, by means of soldering. End portions of the side walls 11, 12 are formed with flanges 22 contacting and suitably secured to inner faces of the end walls 17, 18, as shown by dotted lines in Figures 1 and 2. End portions of the abutment walls 13, 14 are formed with flanges 23 overlapping and suitably secured to outer faces of the end walls 17, 18, at the side margins of said end walls.

The arched construction formed by the integral side and abutment walls makes for strength and durability and prevents crushing when an animal's weight is thrown on the side of the trough. The entire trough is simple of construction and may be formed economically with respect to material, and is exceedingly durable.

If desired the trough may be inverted and weights such as bodies of concrete or other plastic, indicated by the numerals 24, 25, placed within the V-shaped spaces between the side and abutment walls and bounded at the ends by the end walls. When set and hardened these concrete bodies are retained in place by the flanges 20, 15 and 16, which prevent removal of such bodies when the trough is in upright position. This further strengthens the sides of the trough and also adds considerable weight so that the trough is not easily moved about nor overturned by the animals using it or occupying the enclosure in which it is placed.

I claim as my invention—

1. A watering trough, comprising bottom, side and abutment walls, the spaces between the side and abutment walls being substantially V-shaped in cross-section, end walls contacting and secured to said bottom, side walls and abutment walls, inturned flanges being formed at the bottom of said trough, and weights mounted in the spaces between said side and abutment walls and retained by said flanges.

2. A watering trough, comprising bottom, side walls and abutment walls integrally formed, the spaces between the side and abutment walls being substantially V-shaped in cross-section, and end walls contacting and secured to said side and abutment walls and bottom, said end walls and abutment walls being formed with inturned flanges at their lower margins, together with weighted bodies in and filling the spaces between said side, end and abutment walls and retained by said inturned flanges.

Signed at Webster City, in the county of Hamilton, and State of Iowa, this 21st day of March, 1921.

WILLIAM A. McCOLLOUGH.